United States Patent [19]

Flöther

[11] 4,336,990
[45] Jun. 29, 1982

[54] DIAPHRAGM CONTROL SYSTEM

[75] Inventor: Werner Flöther, Aalen, Fed. Rep. of Germany

[73] Assignee: Carl Zeiss-Stiftung, Oberkochen, Fed. Rep. of Germany

[21] Appl. No.: 203,995

[22] Filed: Nov. 4, 1980

[30] Foreign Application Priority Data

Nov. 7, 1979 [DE] Fed. Rep. of Germany ....... 2944888

[51] Int. Cl.³ .......................... G03B 9/02; G03B 7/20
[52] U.S. Cl. ....................................... 354/272; 354/46
[58] Field of Search ................ 354/270, 272, 274, 40, 354/46, 45, 232, 286; 352/141

[56] References Cited

U.S. PATENT DOCUMENTS

| | | | |
|---|---|---|---|
| 2,929,308 | 3/1960 | Swarofsky | 354/274 |
| 2,949,837 | 8/1960 | Bäab | 354/274 |
| 3,687,047 | 8/1972 | Ito | 354/274 |
| 3,858,225 | 12/1974 | Hasegawa et al. | 354/46 |
| 3,987,472 | 10/1976 | Saito | 354/46 X |
| 3,997,906 | 12/1976 | Kashiwase | 354/272 X |

*Primary Examiner*—Donald A. Griffin

*Attorney, Agent, or Firm*—Stonebraker, Shepard & Stephens

[57] ABSTRACT

A control system for diaphragms of photographic cameras, of the type where the diaphragm is in a lens assembly interchangeably mounted on the camera, and the camera contains mechanism for controlling the aperture of the diaphragm. The diaphragm blades are moved, for adjusting the aperture, by rotation of the usual slotted ring, and the movement of this ring is non-linear; that is, the ring does not turn through equal distances in order to produce aperture changes through successive equal increments of the usual diaphragm aperture scale. The movements of the aperture determining mechanism within the camera body, however, are linear. According to the invention, the interchangeable lens assembly containing the diaphragm has a finger which engages the mechanism in the camera on which the assembly is mounted and which partakes of linear movements in accordance with the movements of the mechanism in the camera. This finger is coupled through a pivoted member controlled by a cam to the slotted ring which moves the diaphragm blades, so that the linear movement produced by the camera mechanism is transformed into a non-linear movement of the slotted ring in the interchangeable lens assembly.

5 Claims, 3 Drawing Figures

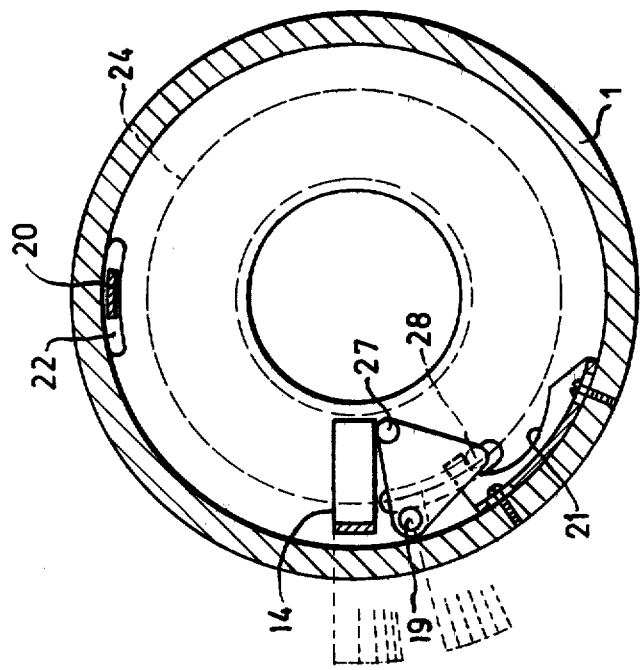
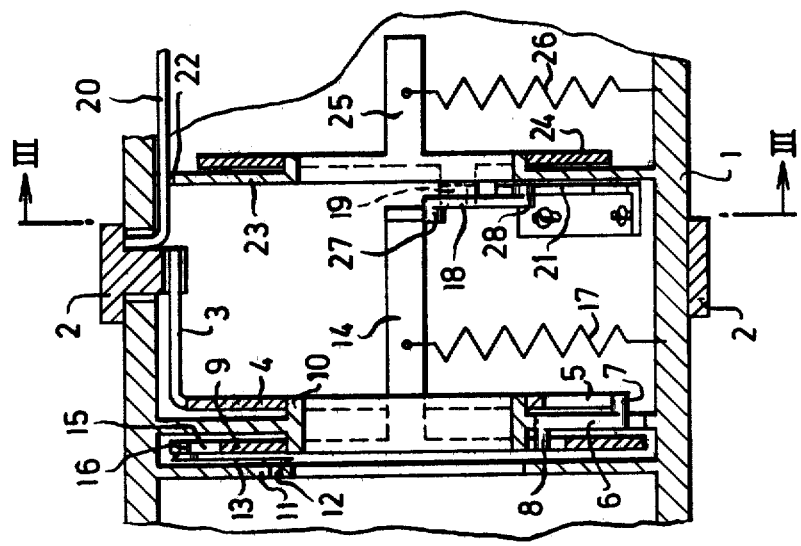

DIAPHRAGM CONTROL SYSTEM

BACKGROUND OF THE INVENTION

This invention relates to a diaphragm control system for interchangeable lenses with which there is possible, optionally, either a manual adjustment of the diaphragm or an adjustment which is effected automatically by means of a camera with an automatic exposure mechanism.

It is already known to use so-called instant-return diaphragms which are released by the camera mechanism just before the exposure and then close to a value which has been manually selected by the user. The control finger which engages into the camera is in this case connected directly with a slotted ring, and upon the actuation of the diaphragm, it carries out a movement referred to below as non-linear, i.e. for equal diaphragm intervals the control finger moves over unequal paths or angular steps which become constantly smaller the further the diaphragm closes. In the case of lenses with instant-return diaphragm no special demands are made as to the course of movement of the control finger or diaphragm blades, it being merely essential that the slotted ring move from the end abutment provided for maximum opening to the end abutment corresponding to the aperture which has been selected.

This end abutment which is adjusted by means of the diaphragm preset ring on the lens is generally driven via a movable cam which converts the linear movement of the diaphragm preset ring to an adjustment movement which corresponds to the non-linear movement of the slotted ring.

If such a lens is to be used in combination with a camera which automatically adjusts the diaphragm to a value calculated on basis of the predetermined exposure time and the measured conditions of light, then the non-linear movement characteristic of the control finger makes itself felt in an especially detrimental manner. In particular, with a small diaphragm aperture the extent of movement of the control finger between two adjacent diaphragm intervals or settings is so small that an accurately reproducible association between the diaphragm value selected by the camera mechanism and that actually transmitted by the control finger to the diaphragm is no longer possible with the desired accuracy, due to manufacturing tolerances and looseness in the coupling between camera and lens assembly containing the diaphragm.

A proportional enlargement of the stroke of the control finger in order to circumvent these difficulties is undesirable since the speed of closing of the diaphragm is reduced if longer paths of movement are provided. Furthermore, the non-linear movement characteristics, which are different for different types of lenses, give rise to difficulties upon the conversion of the calculated electric value into the position of the control finger corresponding to the true diaphragm value.

Known interchangeable lens systems with automatically adjustable diaphragm operate with a so-called "diaphragm stop" which is arranged in the housing and when the automatic diaphragm mechanism is set serves as an abutment for the control finger instead of the abutment which is displaceable in the lens housing upon manual presetting of the diaphragm. The position of the diaphragm stop is, corresponding to the movement characteristic of the control finger, dependent also in non-linear manner on the diaphragm value calculated in the camera and transmitted via electric-motor converter and mechanical transmission to the diaphragm stop. Here therefore the linearization of the control movement takes place in the camera, preferably electronically. Although this represents an advantageous solution as viewed from the standpoint of the space in the lens and the camera housing, the problem arises here of the difficulty of reproducible adjustment of small diaphragms since the coupling between a non-linearly moved control finger and the diaphragm stop takes place at the camera/lens interface.

SUMMARY OF THE INVENTION

The object of the present invention is to create a diaphragm control which permits simple and dependable coupling of lenses equipped with such diaphragm control, with automatic-diaphragm and automatic-time-release cameras, and which is compatible with existing control systems for automatic time-release cameras in combination with instant-return diaphragms.

This purpose is achieved in accordance with the invention in the manner that the control finger which engages into the camera is connected with the diaphragm blades or leaves by an intermediate system which serves for converting a linear movement into a non-linear movement.

The advantage of the invention is that transmission errors caused by play, inexact coupling, etc., always act to the same extent, regardless of the diaphragm set, on a diaphragm finger which moves linearly at the camera/lens interface. In other words, errors in the diaphragm adjustment do not increase disproportionately in the case of small diaphragm apertures.

Another advantage consists in the fact that on the camera side of the interface, the producing of the actual diaphragm value is extremely simple and can take place in universal fashion for lenses having the most different movement characteristic curves of the diaphragm blades, since the linearization of the movement takes place in the lens assembly and the camera merely has the task of converting the electronically computed diaphragm intervals into proportional paths of the setting mechanism. With this principle extensive standardization of different types of lenses with respect to the diaphragm control is very easily possible.

It is advisable to develop the slotted ring in known manner so that it participates in the non-linear movement of the diaphragm blades and to arrange, between diaphragm ring and control finger, a mechanical transmission element which is pivotally connected with the diaphragm ring and the control finger and rests on a fixed cam.

In this way only one cam is required for all (6-8) diaphragm blades, in contradistinction to solutions in which the linearization of the movement of the diaphragm blades takes place via the cam slots of the controlling ring. Said cam is fastened in fixed position on the lens housing and makes it possible therefore to use a transmission element of low inertia to facilitate short diaphragm closing times.

Older lenses provided with previously unlinearlized control fingers can also be easily subsequently converted, according to the present invention. For this purpose there is merely required, instead of the old control finger, a divided control finger which is connected with the transmission element as well as a cam which is adapted to the transmission function.

Of course, even non-linearized lenses are compatible, without conversion for pure automatic-time-release operation, with the combined automatic diaphragm and time-release camera intended for linearized lenses, in the same way as linearized lenses are compatible with cameras for pure automatic time release. For the latter combination the course of movement of the control finger is immaterial, as explained above. For the first combination, the automatic diaphragm mechanism present in the camera is done away with, but the users of non-linear lenses are, after all, accustomed also to pure automatic time-release operation and need not tolerate any limitation in function.

The prerequisite for the compatibility described is merely that the total stroke of the linearized control fingers agree with that of the non-linear control fingers. This can also be achieved in all cases by a suitable development of the transmission element; for instance, by a cam which in the region of large diaphragm apertures transmits the movement of the control finger, and in the region of small diaphragm apertures produces a stepdown effect, the transition between these regions being, of course, fluid.

The cam can be fastened displaceably with respect to the lens housing and in this way makes a simple adjustment of the starting position of the control finger possible.

BRIEF DESCRIPTION OF THE DRAWINGS

One illustrative embodiment of the present invention will now be described with reference to the accompanying drawings, in which FIG. 1 shows schematically a longitudinal section through a part of an interchangeable lens which contains the automatic diaphragm control mechanism, according to a preferred embodiment of the invention;

FIG. 3 is a schematic cross section taken approximately on the line III—III of FIG. 1, with parts omitted.

DESCRIPTION OF THE PREFERRED EMBODIMENT

Figure 2:
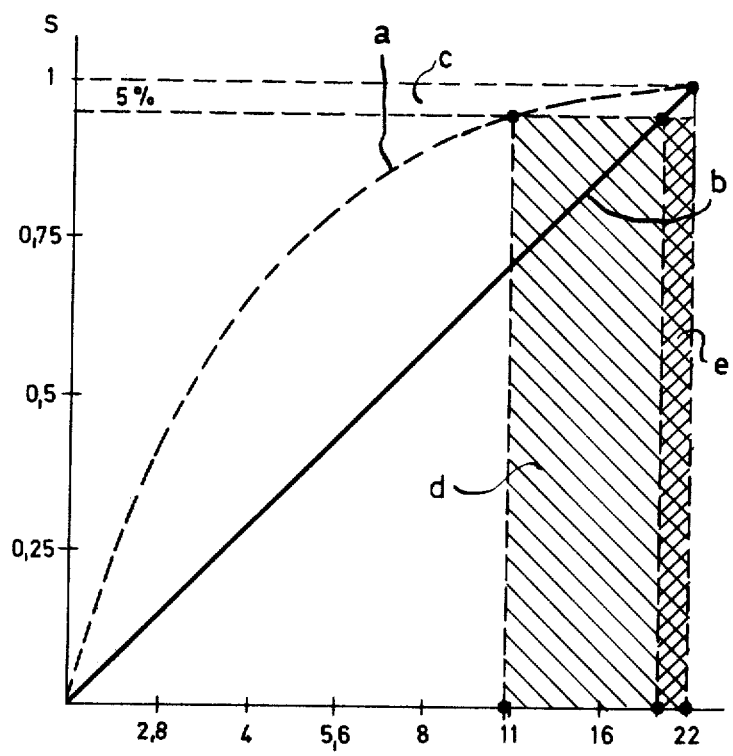
FIG. 2 shows the course of movement of the control finger and the influence of coupling errors between camera and lens on the automatic diaphragm setting via control fingers with linear and non-linear stroke.

Around a lens housing 1 there is placed a diaphragm preselection ring 2 which is connected via a lever 3 with a rotatably supported ring 4. The diaphragm preselection ring 2 furthermore has a diaphragm preselection finger 20 which extends rearward through an opening 22 having the shape of a ring segment or arcuate slot in the part 23 which is fixed to the housing. This finger 20 serves to enter the preselected diaphragm value into the mechanism of a camera to be attached to the lens housing 1 in the case of automatic time-release operation.

On the outer periphery of the ring 4 there is a cam 5 by which the abutment 8 of the lever 6 is displaced via the projection 7, when the diaphragm preselection ring 2 is turned. The said abutment 8 for the rotatable slotted or cam ring 9 carries out a non-linear movement derived, via the cam 5, from the circular movement of the diaphragm preselection ring 2 with equal angular steps per diaphragm value. Such a non-linear movement is necessary since the apertures of the diaphragm which correspond to the international series of apertures are established in non-linear manner.

The slotted ring 9, upon the turning of the preselection ring 2, actuates, via slots 15, the diaphragm blades or leaves 13 which engage therein via projections 16 (the diaphragm is shown in open position), which blades are mounted for rotation around pins 12 in the part 11 which is fixed to the housing. Furthermore, the slotted ring 9 is provided on its outer circumference with a diaphragm finger 14 which, via a spring 17, presses the slotted ring 9 in the diaphragm closing direction toward and against the abutment 8.

Up to now, there has been described the construction of a traditional instant-return diaphragm arrangement in a lens, if one imagines the diaphragm finger 14 coupled with the non-linearly movable slotted ring 9 as being lengthened in the direction rearwardly toward the camera housing, that is, rightwardly when viewed as in FIG. 1.

In the embodiment of the invention shown in FIG. 1, the diaphragm finger 14 is coupled with the camera body via additional intermediate members. One of these intermediate members is a control finger 25 which, upon the attachment of the lens housing to the camera body in "automatic diaphragm" operation, can be turned via an actuating member controlled by the automatic mechanism of the camera (not shown in the drawing) or serves as adjustable abutment for the control finger 25. In this type of operation, the preselection ring 2 is set to the smallest possible diaphragm aperture in order not to limit the range of displacement of the diaphragm by the abutment 8.

The turning of the control finger 25 takes place, as indicated by the diaphragm scale shown in broken lines below the finger 25, in a linear manner, i.e. each diaphragm step corresponds to the same angle of rotation of the control finger 25 and thus of the ring 24 which is firmly connected to the control finger 25. A spring 26 effects a biasing of the ring 24 in the direction of the closing motion of the diaphragm.

In a tongue of the ring 24 there is supported a pin 19 around which an intermediate body 18 is turnable. This intermediate body, in the form of a triangular lever, bears a first bolt or projection 27 against which the diaphragm finger 14 rests under the action of the spring 17, and a second bolt or projection 28 by means of which the intermediate body 18 rests against the cam 21 which is in fixed position in the housing during any single exposure operation, but its position is adjustable for calibration purposes.

Upon the turning of the control finger 25 via the automatic mechanism of the camera body, the ring 24 is turned linearly as a function of the calculated diaphragm number. This rotation produces, via the intermediate body 18 and the cam 21, a non-linear rotation of the diaphragm finger 14 and thus of the slotted ring 9 which operates the shutter leaves 13. This non-linearity corresponds to the scale graduations of the diaghraph apertures, shown schematically in FIG. 1 in broken lines below the finger 14.

The lens in accordance with the invention can also be placed on a camera with automatic time-release mechanism. In such case, the diaphragm is preselected via the diaphragm preselection ring 2 or the diaphragm preselection finger 20, i.e. the abutment 8 is adjusted accordingly. Upon the release, the diaphragm is closed to the preselected value by release of the control finger 25 under the action of the springs 26 and 17.

The total stroke of the control finger 25 is equal to that of the diaphragm finger 14 and corresponds essentially to the chord of the curve of the cam 21 which, easily adjustable along its chord, is fastened adjustably on the lens housing 1 in the plane of the fingers 25 and 14.

It is clear that the cam 21 and the intermediate body 18 can be arranged also in other planes, for example, in order to obtain a compact construction, in a plane perpendicular to the optical axis of the lens.

FIG. 2 shows the dependence of the path s (the angle of rotation) of the diaphragm finger 14 (curve a) and of the control finger 25 (curve b) on the diaphragm set.

With a constant transmission error of, for instance, 5% of the total stroke (s=1) between the control finger 25 and the camera adjustment mechanism, there is obtained, for the linear control finger 25, a constant diaphragm error of about one-third stop which is transmitted by the play-free transmission by the intermediate piece 18 to the groove ring 9. This error is shown graphically at e.

If the diaphragm ring 14 were directly in engagement with the diaphragm setting mechanism of the camera, the same transmission error of 5% would cause, at the camera-lens interface in case of small diaphragm apertures, an error of more than two stops which is no longer tolerable, compared with which the better behavior with the diaphragm open is unimportant. This error is indicated by the shaded portion d plus the portion e. Thus, the great improvement resulting from the present invention is graphically apparent.

What is claimed is:

1. A diaphragm control system for a diaphragm forming part of an interchangeable assembly for mounting on a camera of the type having automatic diaphragm aperture setting mechanism, said diaphragm including blades movable to vary the aperture of the diaphragm and a slotted ring member rotatable for moving said blades, said control system comprising a control finger member mounted on said assembly and engaging with the automatic diaphragm aperture setting mechanism of the camera on which the assembly is mounted, said finger member being operatively connected to said ring member, and means for converting a linear movement of one of said members into a non-linear movement of the other of said members.

2. The invention defined in claim 1, wherein said means is so designed that a linear movement of said finger member causes a non-linear movement of said ring member.

3. The invention defined in claim 1, wherein said means comprises a second ring connected to and turning with said control finger member, a second finger connected to and moving with said slotted ring member, an intermediate piece (18) pivotally connected with said second ring and engaging said second finger, and a cam (21) for controlling in part the movement of said intermediate piece.

4. The invention defined in claim 3, wherein said cam is displaceably mounted in said assembly for purposes of adjustment.

5. The invention defined in claim 3, wherein said assembly has an optical axis and said cam is arranged in a plane perpendicular to the optical axis.

* * * * *